United States Patent Office 3,437,394
Patented Apr. 8, 1969

3,437,394
ELECTROMAGNETIC MIRROR DRIVE SYSTEM
Norman M. Hatcher, Gloucester, and Nelson J. Groom and Arthur L. Newcomb, Jr., Newport News, Va., assignors to the United States of America as represented by the Administrator of the National Aeronautics and Space Administration
Filed July 26, 1966, Ser. No. 568,071
Int. Cl. G02b *17/00*
U.S. Cl. 350—6          4 Claims

ABSTRACT OF THE DISCLOSURE

A device for scanning a horizon with a pair of mirrors. The two mirrors scan in the same plane but in different directions. Each of the mirrors has a gear attached to its back and the two gears are meshed together. Electromagnetic means are provided for imparting an oscillatory rotation to one of the mirrors. Hence, this oscillatory rotation is imparted to the other mirror through the two gears.

---

Figure 1:
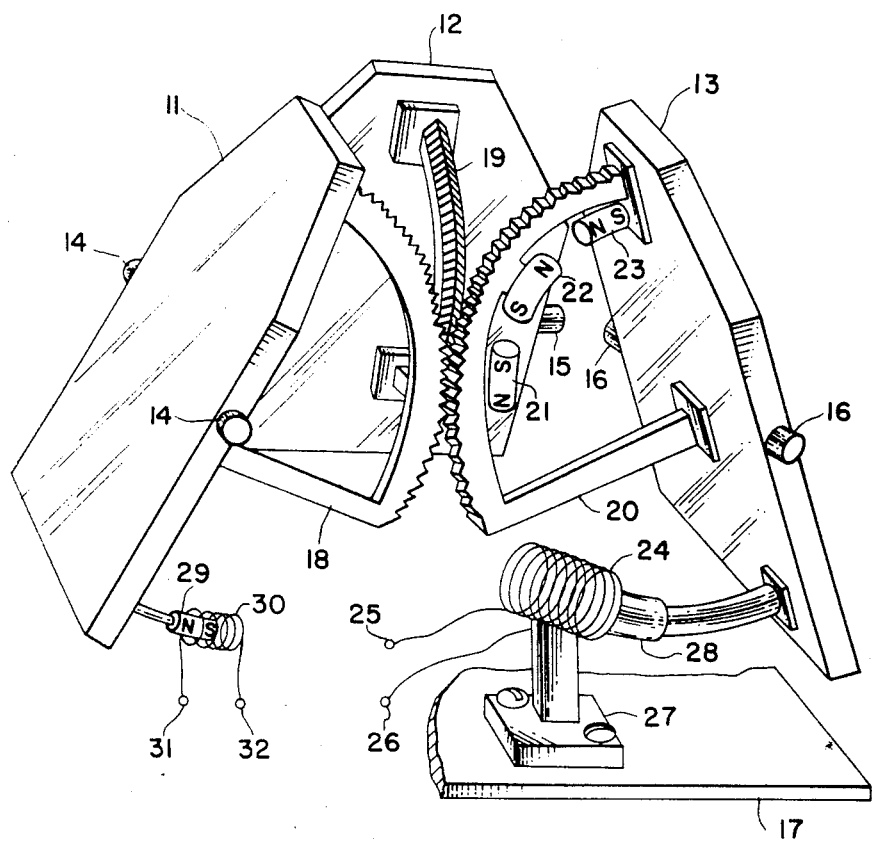

The invention described herein was made by employees of the United States Government and may be manufactured and used by or for the Government for governmental purposes without the payment of any royalties thereon or therefor.

The invention relates generally to a mirror scanning drive system and more specifically concerns an oscillatory electromagnetic mirror drive system for spacecraft horizon scanners.

The general purpose of the invention is to provide an improved mirror drive system for horizon scanners of the type disclosed and described in U.S. Patent No. 3,038,077 and U.S. patent application Ser. No. 369,334. This type of horizon scanner includes two pairs of mirrors that are coupled together and mounted for rotation in a frame that is fixed relative to the spacecraft on which the horizon scanner is used. The mirrors of each pair of mirrors scan the horizon in different directions and the two pairs of mirrors scan the horizon in two mutually perpendicular planes.

The horizon scanner disclosed in U.S. Patent No. 3,038,077 uses a conventional electric motor to continuously rotate the four scanning mirrors. Movement of the scanning mirrors is necessary to rotate the fields of view of infrared radiation sensitive detectors from space across the horizon of the desired planetary body in order for the attitude of the spacecraft to be computed within the scanner. The disadvantages of this mirror drive system relative to the present invention are its larger weight, volume, and power consumption rate; and its lower probable lifetime due to its relatively high speed bearings.

The horizon scanner described in U.S. patent application Serial No. 369,334 oscillates four scanning mirrors by means of a leaf spring and solenoid mechanism which transmits the forces it generates to the mirrors through linkages. The disadvantages of this mirror drive system result from its requirement of linkages and connecting joints between the motor and the mirrors. Since the joints are subject to wear, reliability and accuracy of the scanner are seriously compromised.

It is therefore an object of this invention to provide an improved mirror drive system for a horizon scanner which eliminates most of the linkages between the motor and the mirrors.

Another object of this invention is to provide an improved mirror drive system for a horizon scanner which is lighter in weight, smaller in volume and uses less power than previous mirror drive systems.

A further object of this invention is to provide an improved mirror drive system for a horizon scanner that has a longer probable lifetime and is more reliable than previous mirror drive systems.

Figure 2:
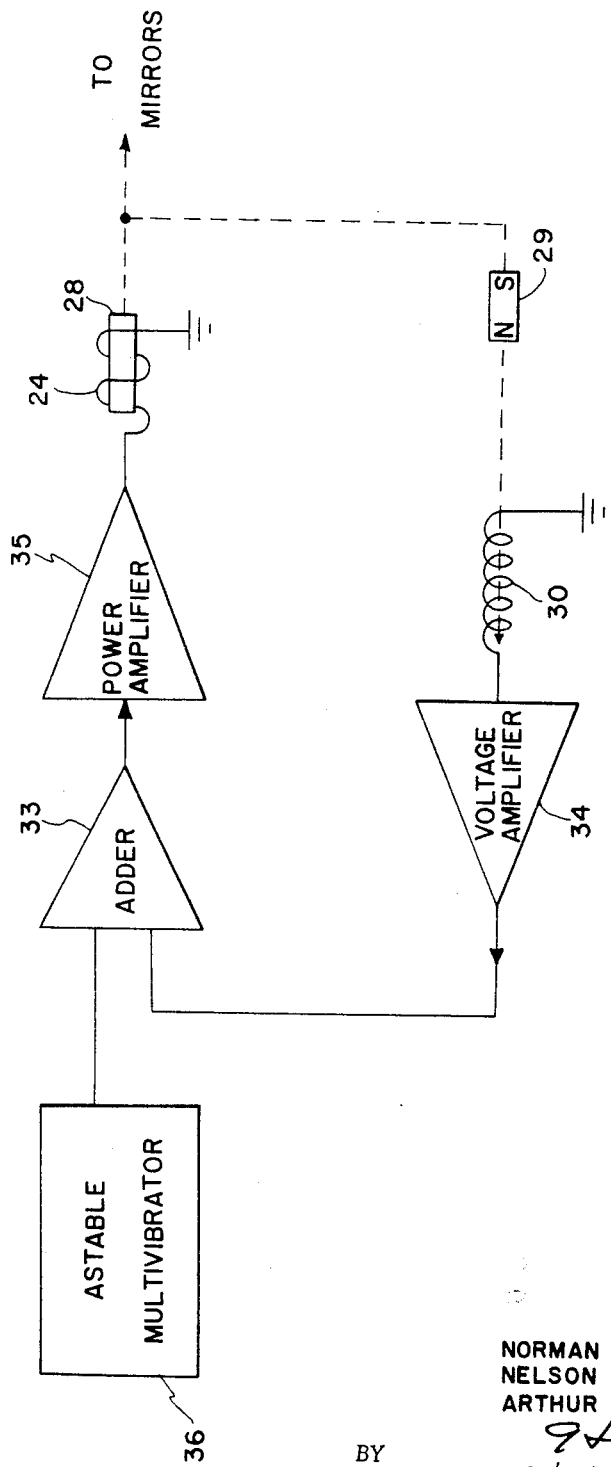

Other objects and advantages of this invention will further become apparent hereinafter and in the drawings, in which:

FIG. 1 is a schematic drawing of the mechanical components of this invention; and FIG. 2 is a block diagram of the electrical components of this invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the preferred embodiment of the invention selected for illustration in the drawing, the numbers 11, 12 and 13 in FIG. 1 designate the mirrors that scan the horizon. Even though only three mirrors are shown, it is to be understood that there are four mirrors. Another mirror appears opposite mirror 12. Mirrors 11 and 13 scan in one plane, and mirror 12 and the mirror not shown scan in a plane perpendicular to the plane scanned by mirrors 11 and 13. Mirrors 11, 12 and 13 are mounted on shafts 14, 15 and 16, respectively, for rotation relative to a frame 17 by means not shown. Frame 17 is only partially shown and is fixed relative to the spacecraft. Attached to mirrors 11, 12 and 13 are gears 18, 19 and 20, respectively, which mesh at the primary axis of the scanner. Three permanent magnets 21, 22 and 23 are used to determine the rest position of the scanner. Magnet 22 is attached to gear 20 and magnets 21 and 23 are attached to frame 17 by any suitable means. The field of magnet 22 opposes the fields of magnets 21 and 23, and thus tends to position the mirrors at some point between their scan arc limits. A solenoid coil 24 having terminals 25 and 26 is attached to frame 17 of the scanner by any suitable means 27. A solenoid armature 28 is attached to mirror 13 so that it is free to move in and out of solenoid coil 24. In the rest position of the scanner armature 28 is located outside coil 24.

When a pulse is applied to terminals 25 and 26 of coil 24, armature 28 is pulled into coil 24 and the center mirror mounted magnet 22 is moved closer to the upper fixed magnet 23. Equilibrium of the forces exerted by the magnet fields is now overbalanced and a net force is exerted on the mirror mounted magnet 22, opposing the force exerted on armature 28 by coil 24. When the pulse applied to terminals 25 and 26 is terminated, mirror 13 is forced by the opposing magnetic fields of magnets 23 and 22 through its rest position. Then the opposing fields of magnets 22 and 21 forces mirror 13 back into its rest position. Armature 28 is now in a position that when another pulse is applied to coil 24 armature 28 will again be pulled into the coil. By varying the strength of the magnets and the widths and frequency of the pulses to coil 24, the mirrors can be made to oscillate at different frequencies and amplitudes.

Attached to mirror 11 is a permanent magnet 29, and attached to frame 17 by suitable means, not shown, is a coil 30 having terminals 31 and 32. When mirror 13 is in its rest position, mirror 11 is also in its rest position and magnet 29 is located outside of coil 30. When a pulse is applied to coil 24 and mirror 13 is pulled out of its rest position, magnet 29 is pushed into coil 30 thereby generating a voltage across terminals 31 and 32 that is proportional to the angular velocity of the mirrors. This voltage is used to make the angular velocity of the mirrors more constant.

The block diagram of the electrical system which is suitable for use with the horizon scanner drive system disclosed in FIG. 1 is shown in FIG. 2. An astable multivibrator 36 produces pulses which are applied to an adder 33. The angular velocity signals generated across solenoid coil 30 are applied through a voltage amplifier 34 to adder 33. The output of adder 33 is applied through a power amplifier 35 to coil 24 to produce the movements of the mirrors.

This invention has numerous advantages over similar scanning devices. It is smaller in volume, it is lighter in weight, it requires less electrical power and it does not have rotor bearings or moving joints. The elimination of these bearings and joints increase the scanner's reliability, life expectancy, and accuracy.

It is to be understood that the form of the invention herewith shown and described is to be taken as a preferred embodiment. Various changes may be made in the shape, size and arrangement of parts. For example, equivalent elments may be substituted for those illustrated and described herein. Parts may be reversed and certain features of the invention may be utilized independently of the use of othre features, all without departing from the spirit or scope of the invention as defined in the subjoined claims. Torsion bars could be used instead of permanent magnets 21, 22 and 23 to determine the rest position of the mirrors. If torsion bars were used, the bars would pass through the mirrors along their rotational axes. One end of each bar would be attached to one side of a mirror and the opposite end would be attached to frame 17.

What is claimed is:

1. An oscillatory electromagnetic mirror drive system for spacecraft horizon scanners of the type in which a pair of mirror assemblies are coupled together and mounted in a frame that is fixed relative to the spacecraft for scanning a horizon in different directions and in the same plane comprising: a solenoid consisting of a coil and an armature with the coil fixed to said frame and with the armature attached to either of said mirror assemblies such that it moves in and out of said coil when the mirror assemblies move; first and second permanent magnets attached to said frame; a third permanent magnet attached to one of said mirror assemblies such that it is located between said first and second permanent magnets and such that its field opposes the fields of the first and second permanent magnets whereby a rest position for the mirror assemblies is determined; and means for periodically applying a voltage to said coil whereby said armature is pulled into said coil while said voltage is applied to said coil and said opposing fields produced by said first and second permanent magnets pull the mirror assemblies into their rest position while a voltage is not applied to said coil thereby producing an oscillatory motion of said mirror assemblies.

2. An oscillatory electromagnetic mirror drive system as defined in claim 1 wherein there are two pairs of mirror assemblies that are coupled together to scan the horizon in two mutually perpendicular planes.

3. An oscillatory electromagnetic mirror drive system as defined in claim 1 wherein said means for periodically applying a voltage to said coil includes an astable multivibrator.

4. An oscillatory electromagnetic mirror drive system as defined in claim 3 wherein means are provided for generating an electrical signal proportional to the angular velocity of the mirror assemblies and means are provided for adding this electrical signal to the output from said astable multivibrator before it is applied to said coil.

References Cited

UNITED STATES PATENTS

| | | | |
|---|---|---|---|
| 3,215,033 | 11/1965 | Van Gelder et al. | 350—301 |
| 3,262,364 | 7/1966 | Kollmorgen | 350—301 |
| 2,922,894 | 1/1960 | Kerr et al. | 250—235 X |
| 3,038,077 | 6/1962 | Gillespie, et al. | |
| 3,225,206 | 12/1965 | Strong et al. | 250—235 X |

FOREIGN PATENTS 252,387  12/1926  Great Britain.

DAVID SCHONBERG, *Primary Examiner.*

PAUL R. GILLIAM, *Assistant Examiner.*

U.S. Cl. X.R.

178—7.6; 350—7